United States Patent
McDole

(10) Patent No.: US 6,381,899 B1
(45) Date of Patent: May 7, 2002

(54) WELL DRILL CUTTINGS DISPOSAL

(75) Inventor: Bruce W. McDole, Cypress, TX (US)

(73) Assignee: Vastar Resources, Inc., Chicago, IL (US)

( * ) Notice: Subject to any disclaimer, the term of this patent is extended or adjusted under 35 U.S.C. 154(b) by 0 days.

(21) Appl. No.: 09/539,070

(22) Filed: Mar. 30, 2000

(51) Int. Cl.⁷ .............................................. A01B 79/00
(52) U.S. Cl. ................................ 47/58.1; 71/904; 71/6; 435/262; 435/262.5
(58) Field of Search .................... 47/58.1, 9, DIG. 10; 71/9, 13, 6

(56) References Cited

U.S. PATENT DOCUMENTS

| | | | | |
|---|---|---|---|---|
| 3,661,549 A | * | 5/1972 | Freytag | 71/1 |
| 5,336,290 A | * | 8/1994 | Jermstad | 71/13 |
| 5,609,668 A | * | 3/1997 | Gill | 71/9 |
| 6,187,581 B1 | * | 2/2001 | Sicotte et al. | 435/262 |

* cited by examiner

Primary Examiner—Peter M. Poon
Assistant Examiner—Andrea M. Valenti
(74) Attorney, Agent, or Firm—F. Lindsey Scott; Robert E. Sloat

(57) ABSTRACT

A method for converting well drilling cuttings that carry petroleum hydrocarbons to an environmentally friendly humus-like product wherein salt, if present, is washed therefrom, the washed cuttings mixed with a feedstock having a carbon and nitrogen content sufficient to encourage a biopile composting reaction, forming an environmentally acceptable plant growth enhancing humus-like product by continuing the biopile composting reaction until (1) the biopile is reduced in weight and/or volume to a total biopile weight and/or volume that approaches the original weight and/or volume of the drill cuttings before the feedstock was added thereto, and (2) the total petroleum hydrocarbon content of the biopile is reduced to an environmentally friendly level for spreading on the earth's surface.

16 Claims, 1 Drawing Sheet

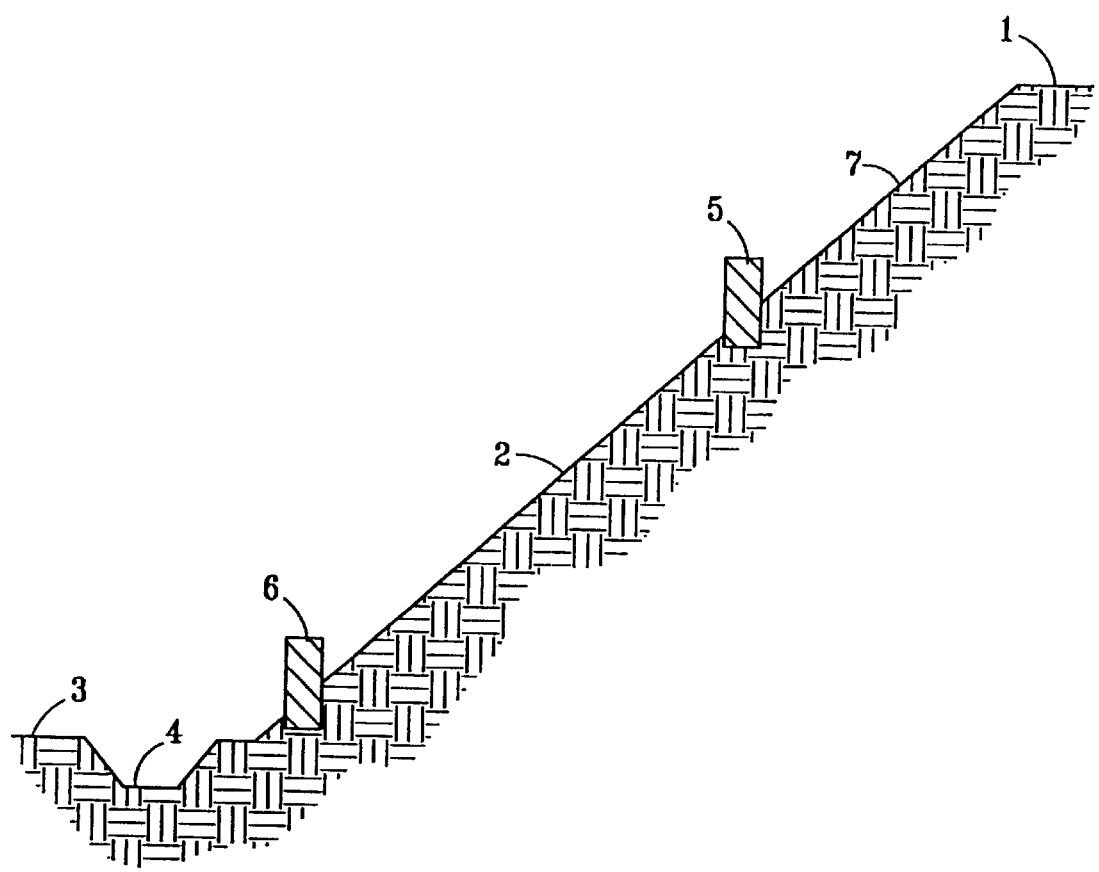

WELL DRILL CUTTINGS DISPOSAL

FIELD OF THE INVENTION

This invention relates to a process for converting well drilling cuttings that carry in or on them petroleum hydrocarbons in such a manner that the drill cuttings are converted to a product that is environmentally acceptable for spreading on the earth's surface.

BACKGROUND OF THE INVENTION

When drilling oil and gas wells into subterranean formations below the earth's surface particles of the formation drilled through, known as drill cuttings, are formed by the drilling process. These cuttings vary in size from fines to sand size to pebble size and can carry petroleum hydrocarbons from an oil-based drilling mud used to drill the well, from petroleum hydrocarbons naturally occurring in the formations that were drilled through, or from other sources. The result is that the drill cuttings recovered at the earth's surface carry, either internally or on their surface or both, petroleum hydrocarbons. The drill cuttings can also carry salts of various compositions but primarily alkali metal and alkaline earth metal salts that are naturally present in the formations being drilled through, in liquids in those formations, or in the drilling mud being used for the drilling process. These drill cuttings need to be disposed of in an environmentally friendly manner.

Various processes have been employed for the disposal of such drill cuttings. One such process involves stabilization of the cuttings followed by disposal of the stabilized cuttings either by burial or road spreading. In this process the cuttings are mixed with an equal weight or volume of environmentally acceptable product such as fly ash or fluidized bed coal ash which have an acceptably low metal content. Disposal of the stabilized cuttings, which are now double their original weight or volume of the original cuttings because of the stabilization process, can be carried out by, (1) burial in the earth in a single monolithic block which in some cases may include encasing the block in a plastic containment wrap, (2) spreading over a large surface area of the earth to a thickness established by current regulations, (3) spreading on an existing road surface followed with a lime-containing cap and compaction, (4) subsurface or annular injection, or (5) transportation to a commercial disposal facility.

The stabilization process, although effective, suffers from the distinct disadvantage of essentially doubling the weight and/or volume of the material, the drill cuttings, to be disposed. The various disposal methods add to this doubling disadvantage of the stabilization process disadvantages peculiar to each disposal method.

For example, burial of a plastic-wrapped monolithic block forms a large block in the earth that was not formerly present but which will now be always present and which can be the subject of required removal in the future should environmental regulations change. Accordingly, burial is an expensive means of disposal that can later become even more expensive if removal is later required, and burial does not help the portion of the earth in which it is buried to restore itself to its natural condition.

A one-time application of the cuttings to the surface of the earth to a thickness established by current regulations, e.g., less than two inches, requires a large land surface area, and can be carried out on a particular site for a limited number of applications dependent on both site and waste characteristics, thereby requiring a constant search for large and therefore expensive land areas suitable for limited disposal use.

Application to a road surface takes a large amount of road area as well. Lime-containing capping and final compaction is expensive. Like the burial of the monolithic block referred to hereinabove, it would be expensive to remove and dispose of elsewhere if later required.

Subsurface or annular injection is expensive and can involve additional environmental risks should failure or "broach" occur during injection. There is also the risk of claims concerning ground water contamination, which are difficult to prove or disprove.

Transportation to commercial disposal facilities is also expensive and can involve additional environmental risks should an accident occur during transportation. There is also risk to the cuttings owner should the commercial facility be later shown not to have employed environmentally acceptable disposal processes or techniques.

Accordingly, it is highly desirable to have a process that does not double the weight or volume of the drill cuttings to be disposed of and which disposes of the drill cuttings near the drill site in an environmentally friendly manner that enhances rather than detracts from the disposal site returning to its natural condition in a reasonably short length of time.

SUMMARY OF THE INVENTION

In accordance with this invention, drill cuttings carrying petroleum hydrocarbons, water, produced water, various drill mud additives, and sometimes salts, are converted to a plant growth enhancing humus-like product without substantial increase beyond the original weight and volume of the drill cuttings themselves while at the same time reducing the total petroleum hydrocarbon content (and salt content, if any) to environmentally friendly levels.

The humus-like product of the process of this invention can be used to enhance plant growth on disturbed surface soil areas that are subject to the loss of surface solids to storm water runoff, particularly when disturbed areas are on sloping land.

BRIEF DESCRIPTION OF THE DRAWINGS

FIG. 1 is a cross sectional view of a sloping land surface and shows one method by which the humus-like product of this invention can be disposed on the earth's surface even with a rather steep slope to that land surface.

Other aspects, objects and advantages of this invention will be apparent to those skilled in the art from this disclosure and the appended claims.

DETAILED DESCRIPTION OF THE INVENTION

The drill cuttings are produced from the drilled wellbore to the earth's surface and vary from fines to pebble size rock that carries with it in many cases petroleum hydrocarbons, water, produced water, various drill mud additives, as well as some salts. The petroleum hydrocarbons most often occur naturally in the formations drilled through and/or in the drilling fluid used in the drilling process, and are hydrocarbons normally associated with those found in naturally occurring crude oil or refined crude oil such as diesel fuel. Salts, if present, can occur in the formations themselves, liquids such as salt water in the formations or in the drilling fluids employed. The salts basically are alkali or alkaline earth metal halides, such as sodium chloride or calcium chloride, hydroxides, such as potassium hydroxide, and the like. Neither the petroleum hydrocarbon content or salts in the drill cuttings promote or support the growth of plants if the drill cuttings were to be disposed of on the earth's surface in their original state. It is desirable that the drill cuttings, when ultimately disposed, especially on the earth's surface, support or enhance the growth of plants, such as grasses, bushes, trees, and the like, thereby aiding the disposal site in a rapid restoration to a natural condition.

Thus, in accordance with this invention the drill cuttings are processed so as to reduce the total petroleum hydrocarbon content thereof, and reduce the salt content thereof if necessary, to an environmentally friendly level for spreading on the earth's surface. By environmentally friendly level, it is meant whatever federal and/or state requirements apply at the time for disposal of the drill cuttings on the earth's surface that, based on good science, will facilitate rapid re-vegetation.

In accordance with this invention, the drill cuttings to be processed are first placed into a contained working enclosure which can be either tankage disposed on the surface of the earth or a pit dug into the earth and lined with a protective plastic film such as a conventional geomembrane. The enclosure should be of a size to adequately contain all the drill cuttings to be processed, plus an equivalent weight or volume of feedstock to be described hereinafter, and still allow a freeboard distance to prevent overflow during subsequent processing and to allow free liquids to be separated and returned to other sites for reuse or the like. The enclosure can be located adjacent to the shaker slide and centrifuge slide of the well drilling apparatus so that they can be processed on-site without any risky transportation thereof. The cuttings can be readily moved to the enclosure in large amounts by means of a backhoe or similar equipment so that additional amounts of drill cuttings can be added as necessary from time to time. After the drill cuttings in the enclosure have undergone the process of this invention and have been removed for spreading on the earth's surface, the enclosure can be moved, if transportable. If the enclosure is a pit in the earth's surface, the plastic liner can be removed and disposed of at an approved facility, and the pit closed without damage to the earth adjacent to the pit or plastic liner.

If, as in some but not all cases, the drill cuttings have an unacceptably high salt content for sustaining plant growth, a salt remediation process is first practiced on the cuttings in the enclosure which simply involves mixing the cuttings with a liquid such as fresh water to wash salt from the cuttings. The liquid wash in this remediation step can contain other additives that help remove undesired salt such as dolomitic lime, gypsum, calcium chloride or the like.

The wash liquid, with or without additives, is physically mixed with the cuttings in the enclosure, for example, by using a backhoe in the case of an earthen pit. The undesired salts are allowed to dissolve in the wash liquid, and the wash liquid then removed, for example, into vacuum trucks for disposal of the salty wash liquid in an acceptable manner such as re-injection into a salt water formation under the earth's surface.

This salt remediation step should reduce the salinity of the drill cuttings in the enclosure to or near an acceptable level for sustaining plant growth on the earth's surface.

Thereafter a bioremediation step is undertaken to treat the petroleum hydrocarbon content of the cuttings. In this step, a feedstock is added to the cuttings in the enclosure. The feedstock can be any naturally occurring organic material, such as wood chips, grass cuttings, hay, animal manure and the like, or an artificial nitrogen and carbon-containing material such artificial fertilizer. The feedstock should have a carbon and nitrogen content sufficient to encourage the biopile that is formed by mixing the cuttings with the feedstock to undergo a biopile composting reaction.

A biopile composting reaction is composed of two distinct phases. The first phase is characterized as mesophilic and the second stage as thermophilic. The first, mesophilic phase, occurs at temperatures below 130° F. The thermophilic phase occurs at temperatures equal to or greater than 130° F., that are self-generating within the biopile. The initial reaction of the biopile compost mix in the mesophilic phase takes place within approximately 24 hours. Thereafter the biopile naturally evolves into the thermophilic phase which can last a matter of days or weeks depending on the feedstock used, the petroleum hydrocarbon content of the drill cuttings, and many other factors. The original biopile can be aided in moving promptly through the mesophilic phase and into the thermophilic phase by the addition of compost mixture from a prior bioremediation process. This gives the biopile compost mixture just undergoing bioremediation an initial microbial spike to get the process going quickly.

The thermophilic phase can be enhanced and its time for processing reduced by mixing the biopile materials, cuttings and feedstock, as well as adding oxygen and, sometimes water, to the biopile mixture. Oxygen can be introduced by way of air such as by mechanically turning the biopile mix with a backhoe in a lined earthen pit. Water can be added from time to time by simply spraying same onto the biopile in the enclosure with or without mixing.

During the thermophilic phase, substantial amounts of material degradation occurs in the biopile which, over time, reduces the overall weight and/or volume of the initial biopile to a total weight and/or volume for the final, cured for the biopile that, although starting out as approximately double the weight or volume of the original drill cuttings, approaches the original weight or volume of the original drill cuttings. Thus, in accordance with this invention, the bioremediation step is carried out until the biopile approaches a weight or volume that is from about 50 percent (50%) to about 70 percent (70%), preferably from about 50% to about 60% of the original biopile weight or volume of the initial biopile. The biopile composting reaction is continued until an environmentally acceptable plant growth enhancing humus-like product is formed in the final cured biopile. This process may require as few as from about ten days, preferably from about ten days to at least about 30 days, but sometimes from about ten days to about 100 days.

Upon completion of the bioremediation step, the resulting biopile material has a total weight or volume not substantially larger, although somewhat larger, than that of the original drill cuttings but has a total petroleum hydrocarbon content of no more than about 50,000 ppm, preferably no more than about 40,000 ppm, still more preferably no more than about 30,000 ppm.

The final, cured biopile is a humus-like product in the enclosure resulting from the biopile composting reaction, and not only is reduced in total petroleum hydrocarbon content but also, if it had a salt content in the original drill cuttings that was unacceptably high for sustaining plant growth, is a reduced in salt content. In this way the humus-like product enhances plant growth by having not only a reduced petroleum hydrocarbon content, but also a salt content as measured by the standard electrical conductivity test well known to those skilled in the art of no more than about 4 milliohms per centimeter.

Thus, the biopile composting reaction of this invention forms an environmentally acceptable plant growth enhancing, humus-like product by continuing the biopile composting reaction until the biopile is not only reduced to a weight and volume which approaches the original drill cuttings, but also reduced in total petroleum hydrocarbon content to an environmentally acceptable level for spreading on the earth's surface.

The humus-like product resulting from the aforesaid biopile composting reaction is suitable for disposition on the earth's surface, even in a relatively small land area. The product does not have to be spread over an area as large as would be required for spreading over the surface of the earth to a thickness of less than one inch or spreading on an existing road surface as mentioned hereinabove. The humus-like product can be spread on the earth's surface to a substantial thickness over a small area. For example, it can be employed in a thickness that will support the planting of bushes or trees as well as seeding for grasses. If areas of the earth's surface adjacent to the drilling apparatus were disturbed for purposes related to the drilling process, those disturbed surfaces can be covered with the humus-like product of this invention and re-seeded with grasses or the like to restore those disturbed surfaces to a natural condition, the drilling process notwithstanding. Thus, by this invention the drill cuttings can be employed to restore the disturbed area around where the wellbore was drilled to a state closely resembling the vegetative characteristics of the site prior to its disturbance.

The feedstock is initially added to the drilling cuttings in the enclosure in a weight and/or volume that is approximately the same as that of the original drill cuttings, give or take 20% of the weight and/or volume of the original drill cuttings. Thus, the original biopile is roughly double the weight and/or volume of the original drill cuttings. After the biopile composting reaction has been carried out to the extent required in accordance with this invention, the biopile is reduced in weight and/or volume as aforesaid. Thus, by this invention no more weight or volume of material is disposed of on the earth's surface than was approximately the weight or volume of the original drill cuttings. This is a substantial advantage over the stabilization and burial process described hereinabove by keeping the cuttings disposal impact on the earth's surface to roughly that of the original drill cuttings.

The feedstock can have a very wide range of carbon and nitrogen content since it can be composed entirely or in large part of naturally occurring organic materials available at or near the drilling site. However, generally the carbon/nitrogen range of the feedstock is generally from about 10 to 1 to about 30 to 1, preferably from about 10 to 1 to about 20 to 1.

The humus-like product of this invention can then be spread over the earth's surface to any desired depth, even on sloping land. The product of this invention is readily physically spread over the earth's surface with conventional equipment, and can even be deposited on sloping land in an environmentally friendly manner. Where there is already some earth on the surface, the product of this invention can be partially disked into the existing soil to enrich the same. Thereafter seeding and/or planting of plants can be carried out in a conventional manner including stabilizing the seeded area with a shredded hay mulch to reduce the potential movement of the product due to rain or watering to maintain needed moisture for starting plant growth. The humus-like product of this invention can also be deployed on sloping land without substantial environmental risk even on land that is relatively steeply sloping, such as grades up to thirty percent (3:1). The humus-like product of this invention can even be employed where no surface soil exists, either naturally or because of drilling operations, to initiate soil formation and plant growth in an area where no plant growth could exist for a long time because of the total lack of surface soil.

FIG. 1 shows one technique by which a sloping surface can be benefitted by deployment of the humus-like product of this invention thereon. In FIG. 1, there is shown essentially level earth surface 1 followed by sloping earth surface 2. Sloping surface 2 ends in a level surface 3 having a catch basin 4 cut there into. Slope 2 is represented as a 30% slope which is a fairly steep gradient for the deployment of a loose mixture such as the product of this invention. Accordingly, hay bales or other barriers are set into the earth at a midsection 5 and bottom section 6 to catch or slow down runoff water which may carry solids from the humus-like product deployed in area 7 upstream of barriers 5 and 6. The product of this invention is disked to about a one foot depth into area 7. Barriers 5 and 6 are set about one foot below the surface of slope 2 as opposed to simply being simply set on surface 2 to more effectively prevent solids runoff due to water runoff from rain or other sources. If there are any such solids water runoff, they can be caught in catch basin 4 so that the deployment of the humus-like product of this invention even on a severely sloped surface can have minimal environmental impact in the short term and long term environmental benefit by building up plant-supporting surface soil on slope 2 in area 7.

EXAMPLE

A conventional oil and gas drilling operation is carried out using an oil-based drilling mud. About 350 cubic yards of drill cuttings, carrying petroleum hydrocarbons from the drilling oil-based drilling mud, are recovered at the earth's surface and disposed in an uncovered earthen pit designed to contain approximately 3,000 barrels of material and still have a two foot freeboard safety factor. The earthen pit is lined with a 30 mil. geomembrane liner and constructed to allow free liquid to be separated and returned to the drilling site for reuse or for subterranean injection as desired.

A random mixture of wood chips, chopped hay and chicken litter is added to the drill cuttings in the pit to constitute the feedstock. The amount of feedstock employed is approximately 350 cubic yards so that the initial biopile has approximately 700 cubic yards in volume and is initially at ambient temperature being exposed to the ambient atmosphere in the earthen pit. For approximately 24 hours the mesophilic phase takes place during which the temperature of the biopile increases from ambient to approximately 130° F. Thereafter, the biopile compost mix naturally evolves into the thermophilic phase which lasts approximately ten days and during which oxygen is added to the biopile by mechanically stirring the mix with a backhoe. Water is added by spraying liquids or water onto the surface of the biopile during mixing. Mixing is carried out three times during the first week, twice during the second and third weeks, and one time during the fourth week. Thereafter, the biopile enters the curing phase and mechanical turning is no longer required. Physical degradation of the biopile is the greatest during the mesophilic phase and the biopile is kept in this phase, i.e., the biopile composting reaction is continued, until the initial biopile is reduced in volume to a biopile volume that approaches the original volume of the drill cuttings before the feedstock is added to the drill cuttings and until the total petroleum hydrocarbon content of the biopile is reduced to an environmentally acceptable level for spreading on the earth's surface and supporting plant life.

Thereafter the humus-like product in the final, cured biopile is spread on the earth's surface and subjected to seeding and planting as described above.

The biopile, after the composting process described above is complete, has degraded to an extent that the amount of remaining humus-like material product is between 350 and 400 cubic yards so that substantial shrinkage occurs approaching that of the volume of the original drill cuttings thereby minimizing the amount of product to be distributed on the earth's surface.

Reasonable variations and modifications are possible within the scope of this disclosure without departing from the spirit and scope of this invention.

What is claimed is:

1. A method for converting well drill cuttings that carry petroleum hydrocarbons to an environmentally friendly humus-like product without substantially increasing the weight or volume of said humus-like product beyond that of said drill cuttings, said drill cuttings having a total petroleum hydrocarbon content unacceptably high by environmental standards for spreading on the earth's surface, the method comprising: placing said drill cuttings in a contained working enclosure, if said cuttings have an unacceptably high salt content for sustaining plant grown, washing said cuttings in said enclosure with a liquid to reduce the salinity of said cuttings to approach an acceptable level for sustaining plant growth on the earth's surface, thereafter adding to said cuttings in said enclosure a feedstock to form a biopile, said feedstock being added in an amount and having a carbon and nitrogen content sufficient to encourage a biopile composting reaction, forming a plant growth enhancing humus-like product by continuing said biopile composting reaction until said biopile is (1) reduced to a total biopile weight and/or volume that approaches that of the original drill cuttings before said feedstock was added thereto and (2) said total petroleum hydrocarbon content of said biopile is reduced to an environmentally friendly level for spreading on the earth's surface, and spreading said biopile humus-like product on the earth's surface.

2. The method according to claim 1 wherein oxygen is added to said biopile to enhance the biopile composting reaction.

3. The method according to claim 1 wherein water is added to said biopile to enhance the biopile composting reaction.

4. The method according to claim 1 wherein the initial biopile has added thereto previously formed humus-like product to enhance the start-up of the biopile composting reaction.

5. The method according to claim 1 wherein the biopile is periodically physically mixed to aid the biopile composting reaction.

6. The method according to claim 1 wherein the humus-like product, after spreading on the earth's surface, is planted with seeds and/or plants.

7. The method according to claim 1 wherein the humus-like product is spread in the vicinity of the well where the drill cuttings were formed.

8. The method according to claim 1 wherein the said feedstock is added to said drill cuttings in a weight that is approximately the same as the original drill cuttings.

9. The method according to claim 8 wherein the weight of the feedstock is within about twenty percent (20%) of the weight of the original drill cuttings.

10. The method according to claim 1 wherein the feedstock is added to said drill cuttings in a volume that is approximately the same as the original drill cuttings.

11. The method according to claim 10 wherein the volume of the feedstock is within about twenty percent (20%) of the volume of the original drill cuttings.

12. The method according to claim 1 wherein the feedstock has a carbon/nitrogen range from about 10 to 1 to about 30 to 1.

13. The method according to claim 1 wherein said biopile composting reaction is carried on for at least about ten days.

14. The method according to claim 1 wherein the salt content of the humus-like product is no more than about 4 milliohms per centimeter.

15. The method according to claim 1 wherein the total petroleum hydrocarbon content of said humus-like product is no more than about 50,000 ppm.

16. The method according to claim 1 wherein the total petroleum hydrocarbon content of said humus-like product is no more than about 40,000 ppm.

* * * * *